United States Patent [19]

Lloyd

[11] 4,223,775
[45] Sep. 23, 1980

[54] DRIVING AND BRAKING APPARATUS

[75] Inventor: John Lloyd, Powick, England

[73] Assignee: Dowty Meco Limited, Worcester, England

[21] Appl. No.: 885,110

[22] Filed: Mar. 10, 1978

[30] Foreign Application Priority Data

Mar. 12, 1977 [GB] United Kingdom ............... 10554/77

[51] Int. Cl.² ...................... F16D 67/06; B60K 41/28
[52] U.S. Cl. .................................. 192/0.094; 192/2; 192/12 D; 198/855
[58] Field of Search ............ 192/12 D, 18 B, 2, 0.094; 318/430, 431, 432; 198/855; 364/469; 188/181 T

[56] References Cited

U.S. PATENT DOCUMENTS

| 2,746,583 | 5/1956 | Blevins | 192/2 |
| 2,892,520 | 6/1959 | Sinclair | 192/2 |
| 2,909,259 | 10/1959 | Diener | 192/12 D |
| 3,244,957 | 4/1966 | Spiess et al. | 318/366 |
| 3,486,101 | 12/1969 | Rufli | 318/431 |

FOREIGN PATENT DOCUMENTS

| 1291283 | 3/1969 | Fed. Rep. of Germany | 198/855 |
| 2252709 | 5/1974 | Fed. Rep. of Germany | 198/855 |

Primary Examiner—Allan D. Herrmann
Attorney, Agent, or Firm—Young & Thompson

[57] ABSTRACT

A driving and braking apparatus usable with a load such, for example, as an uphill belt conveyor. The apparatus includes a motor for exerting driving torque on the load, a first control device for starting and terminating the driving torque, a brake for the load, a second control device for applying and disengaging the brake, a memory device adapted to receive instantaneous values of the torque fed to drive the load, and means interconnecting the first control device, the second control device and the memory device, in such manner that:

(a) upon operation of the first control device to terminate the driving torque fed to the load the second control device operates to apply the brake and the memory device registers the magnitude of the driving torque fed by the motor to the load at the instant of such operation of the first control device, and, (b) upon subsequent operation of the first control device to start the driving torque to the load the second control device operates to disengage the brake when the torque being fed to the load at least attains the magnitude registered in the memory.

7 Claims, 4 Drawing Figures

DRIVING AND BRAKING APPARATUS

This invention relates to a driving and braking apparatus which is particularly, although not exclusively, intended for use with a belt conveyor arranged to carry loose material, such as coal, up an incline.

A belt conveyor, when carrying loose material up an incline, presents at its driving drum a load of which a considerable part is due to gravity and another considerable part is due to friction. When the conveyor is stopped, it can be reasonably expected that the amount of loose material upon it, and thus the gravity load, will not alter. In starting such an inclined belt conveyor from rest it is important that the correct driving torque should be applied to the driving drum of the conveyor before the conveyor brake is released so as to enable the conveyor to start moving smoothly without the possibility of conveyor run-back and also without the possibility of snatching on the belt. The object of the present invention is to produce a driving and braking apparatus, particularly although not exclusively applicable to a belt conveyor which provides for a smooth and accurately controlled driving torque to start the conveyor or other load smoothly from rest.

In accordance with the present invention, a driving and braking apparatus includes motor means for exerting driving torque on a load, a first control device for starting and terminating the driving torque, brake means for the load, a second control device for applying and disengaging the brake means for the load, a memory device adapted to receive instantaneous signals proportional to the torque fed to drive the load, and means interconnecting the first control device, the second control device and the memory device in such manner that:

(a) upon operation of the first control device to terminate the driving torque fed to the load, the second control device operates to apply the brake means and the memory device registers the magnitude of the signal of driving torque fed by the motor means to the load at the instant of such operation of the first control device, and, (b) upon subsequent operation of the first control device to start the driving torque to the load, the second control device operates to disengage the brake means when the signal of torque being fed to the load at least attains the magnitude of the torque signal registered in the memory.

A controllable-slip clutch may be connected between the motor means and the load, so that control of the clutch means may be employed to increase the motor torque fed to the load after the operation of the first control device to start the driving torque.

This clutch means may be a hydro-dynamic clutch controllable as to transmitted torque by variation of the liquid filling thereof.

The motor means may be an electric squirrel cage induction motor and electric power consumed by the motor may be measured directly by means which measure the voltage, current, and power factor whereby to determine the actual electric power consumed by the motor to form a signal torque exerted by the motor, such electric power being registered by any suitable memory device.

Alternatively the signal of the torque produced by the motor means may be obtained by a suitable transducer responding to the case reaction torque of the motor.

One embodiment of the invention will now be described with reference to the accompanying drawings, in which.

Figure 1:
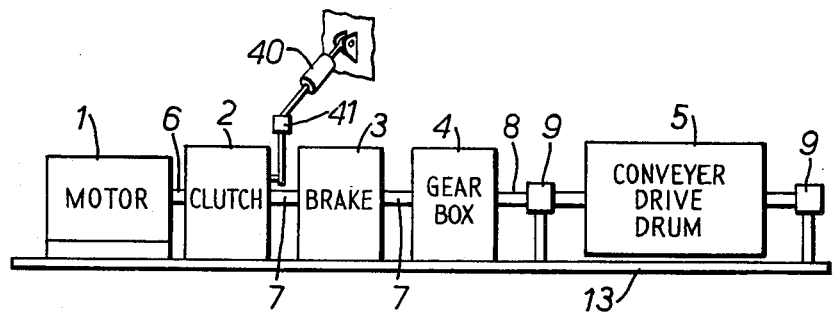
FIG. 1 is a diagrammatic illustration of the apparatus when used with a conveyor.

Referring to FIG. 1 the driving and braking apparatus for a movable load, in this embodiment an upwardly-inclined belt conveyor, comprises an electric driving motor 1, a controllable-slip hydrodynamic clutch 2, a brake 3, a gear box 4, and a drive drum 5 for driving the conveyor. The driving motor 1 is a squirrel cage induction motor. The driving motor 1 is connected by a shaft 6 to a clutch 2 and a shaft 7 from the clutch 2 is connected by way of a brake 3 to the gear box 4. An output shaft 8 from the gear box, supported by bearings 9, drives the drum 5.

Figure 2:
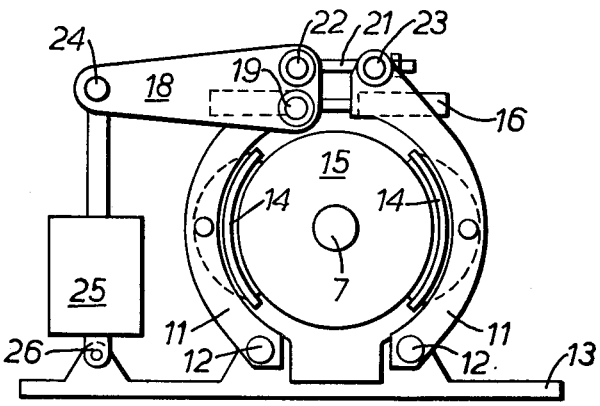
FIG. 2 is a diagrammatic elevation of the brake of FIG. 1.

The brake 3 (see FIG. 2), includes a pair of brake shoe supports 11 carried by pivots 12 which are secured to a base 13. The base 13 also forms the base for all of the elements of FIG. 1. Each support 11 pivotally carries a brake shoe 14 which co-operates with a brake drum 15 carried by the shaft 7. The supports 11, at their upper ends, are urged together by a nest of springs 16, the strength of these springs being such that under the spring thrust the brake shoes 14 are capable of engaging the brake drum 15 to provide sufficient frictional force adequately to hold the conveyor drive drum against movement when the brake is applied. A lever 18 is pivotally secured by pivot 19 to the upper end of one support 11, and a link 21 extends from another pivotal connection 22 on the lever 18 to a pivotal connection 23 at the upper end of the other support 11. A thrustor 25 is pivotally connected at 24 to the lever 18. The thrustor is also pivotally connected at 26 to the base 13.

The thrustor 25 is of well-known construction and comprises an electric motor (not shown) connected to drive a hydraulic pump (not shown) whose output is connected to an hydraulic jack (not shown), the arrangement being such that when the electric thrustor motor is switched on the pivotal connections 24 and 26 of thrustor 25 move apart with considerable force. As a consequence the lever 18 moves in a clockwise sense about pivot 19, from the position shown in FIG. 2 and a parting force is exerted at the upper ends of the supports 11 which overcomes the loading force of the nest of springs 16. Thus, the brake is released when the electric motor of the thrustor is switched on, and the brake is applied when the electric motor of the thrustor is switched off.

Figure 3:
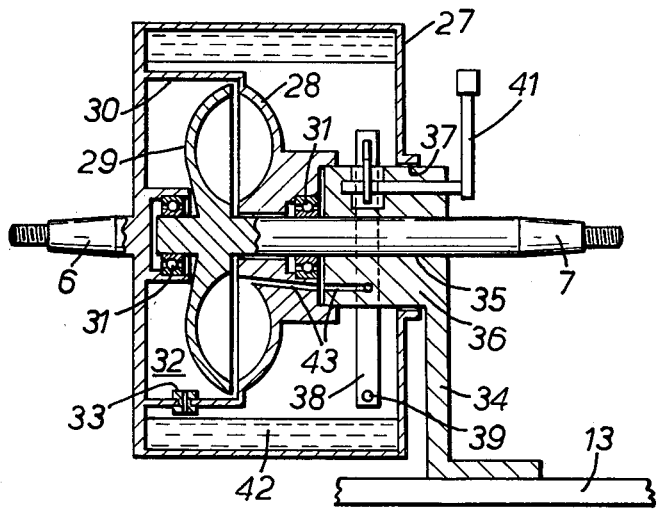
FIG. 3 is a diagrammatic cross-section of the clutch of FIG. 1.

Referring now to FIG. 3, the input shaft 6 to the clutch drives a rotary casing 27 and an internal pump centrifugal rotor 28 fixedly secured to casing 27. A motor rotor 29 is located adjacent the pump rotor 28 and is connected to the output shaft 7. Roller bearings 31 locate the two shafts 6 and 7 together for rotation. The rotor 28 is secured to the casing by an internal wall 30 which defines a clutch chamber 32 within casing 27. A small opening 33 is provided in the wall 30 to ensure a constant leak in use from chamber 32 into casing 27.

The whole clutch is mounted in position on the base 13 by a bracket 34. The upper part of bracket 34 is formed as a cylindrical member 36 which enters a suitable hole 37 into casing 27, appropriate seals being provided to prevent leakage of liquid. The cylindrical member 36 acts as a bearing 35 for shaft 7.

The member 36 slidingly supports a scoop tube 38 and the position of the tip portion of the scoop tube can be moved by a control lever 41 mounted on member 36 radially outwards away from and radially inwards towards the axis of rotation of shaft 7. The lever 41 is movable by means of a second thrustor 40 (see FIG. 1). Thrustor 40 is of similar construction to the thrustor 25 with the exception that it will move lever 41 slowly in response to the switching on and off of its motor.

The supply of liquid 42 is contained in casing 27 and when the tip portion of scoop tube 38 engages in liquid 42 within rotary casing 27 some liquid will be pumped through an opening 39 into the scoop tube and then through passages 43 in the member 36 and the rotor 28. Thus liquid will be supplied to the space between the two rotors 28 and 29 to provide conventional hydrodynamic clutch operation between input shaft 6 and output shaft 7.

The degree of entry of the tip portion of the scoop tube 38 into the liquid 42 determines the amount of liquid which enters the rotors 28 and 29 and will thus determine at any instant the maximum torque which can be transmitted from shaft 6 to shaft 7. The maximum transmittable torque for any particular position of scoop tube 28 will occur when output shaft 7 is not rotating and input shaft 6 is rotating at normal speed. Such torque is referred to as the stall-torque. Thus it will be seen that movement of lever 41 gradually to move the tip portion of scoop tube 38 radially outwards will cause a gradual increase in the stall torque transmittable by the clutch. It will be appreciated that during rotation of the casing 27 the liquid will form an annulus around the periphery of the casing. At any instant when the lever 41 is moved to withdraw scoop tube 38 from the liquid, the liquid within the rotors 28 and 29 will escape through the leak 33 into the casing, steadily reducing the stall torque of the clutch. Instead of leak 33 quick emptying valves may be provided to empty the clutch when the scoop tube is withdrawn from the liquid in the casing.

Figure 4:
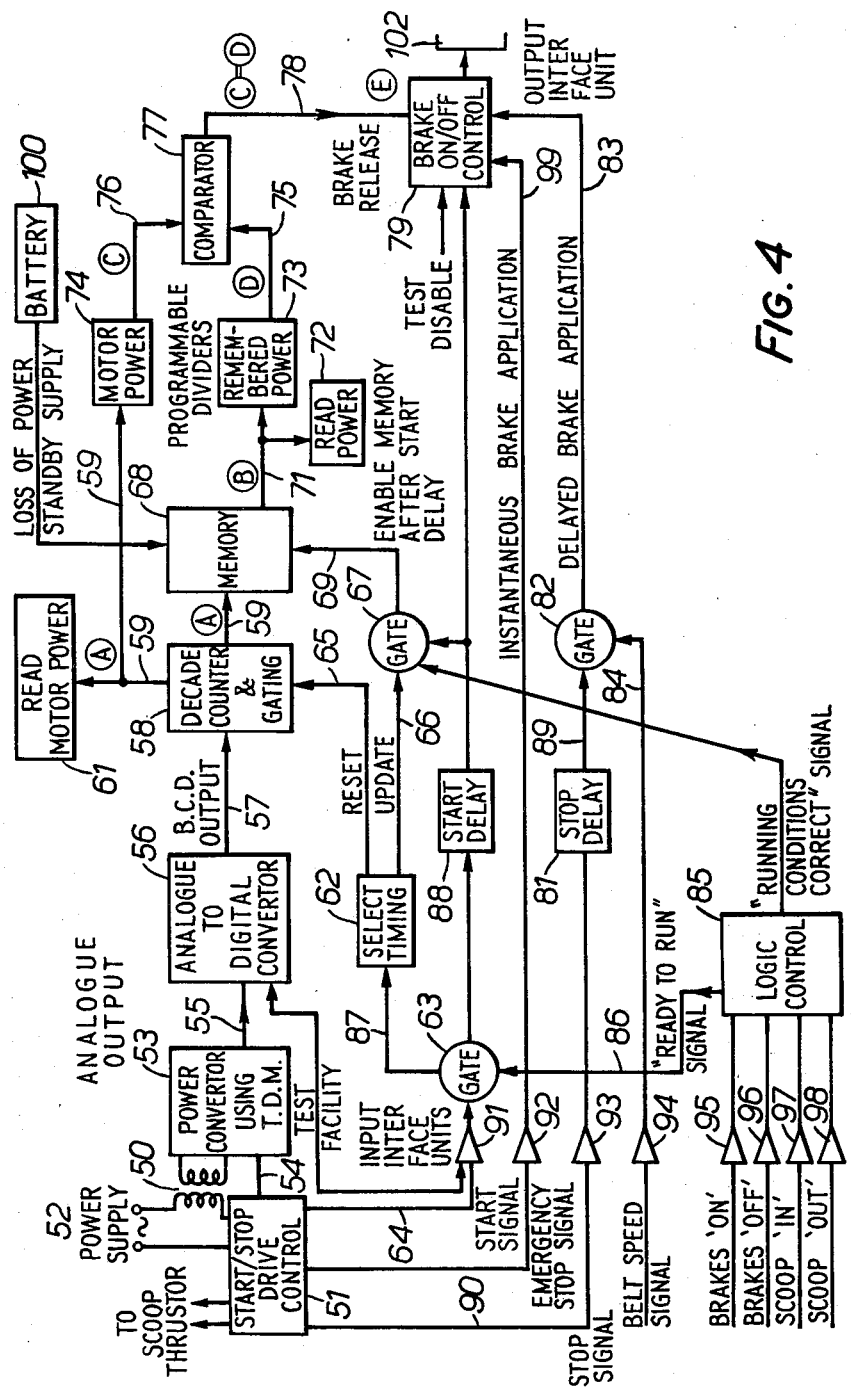
FIG. 4 is a logic circuit diagram for use with the components shown in FIG. 1.

Reference is now made to FIG. 4 to describe control functions for the clutch 2 and brake 3 appearing in FIG. 1. The first control device comprises a start/stop drive control 51 which controls the flow of electric current to thrustor 40 and thus controls the torque fed from motor 1 to drum 5. The electric motor 1 is continuously fed with power from source 52 and rotates continuously at a constant speed and the value or amount of power fed to the motor is a measure of the torque exerted by the motor. The power is measured by the power convertor 53 which receives a voltage signal on conductor 54 and a current signal from current transformer 50. The convertor 53 works on the known time division multi-plex principle and provides an analogue output signal at conductor 55 proportional to power. This signal is fed into an analogue to digital convertor 56, again of known form, providing a digital or pulsed output on conductor 57. Conductor 57 feeds into a decade counter and gate 58, again of known form, having one output 59 connected to a visual numerical indicator 61. A timer 62 controls the counter 58 to determine the length of time over which the input pulses from conductor 57 are counted and converted to decimal form to provide the decimal read-out of motor power at indicator 61. The timer 62 is triggered into operation by a gate 63 which, in turn, is triggered into operation by the receipt of a start signal on a conductor 64 from the start/stop drive control 51. The start signal remains as a constant signal whilst start is selected at control 51. The output signal on conductor 65 from timer 62 sets the counter 58 for its time counting periods. A second conductor 66 from timer 62 carries an input into gate 67.

The memory 68 is a well-known form of memory operating on semi-conductor principles. The memory receives the decimal output on conductor 59 from decade counter 58 and also receives a signal on conductor 69 from gate 67 to render the memory operative. The remembered output on conductor 71 from the memory feeds a visual numerical indicator shown as read power 72 for remembered power and also a programmable divider 73. Both the indicator 72 and the divider 73 are of known construction. A second programmable divider 74 is fed with the output signal from counter 58 on conductor 59. The outputs on conductors 75 and 76 from dividers 73 and 74 are fed into a comparator 77, again of known construction, so arranged that when the output on conductor 76 exceeds the output on conductor 75 comparator 77 will give a signal on conductor 78 to the brake on/off control 79 to cause movement of the brake to the "off" position by the feeding of electric current to the thrustor 25. The brake on/off control forms the second control device.

In order to stop the conveyor the control 51 is moved to the stop position, which will cut off start signal from conductor 64 and feed a stop signal through conductor 90 and stop delay 81 to a gate 82. The output on conductor 83 from gate 82 enters the brake on/off control 79 and will cause the brake to be applied by the cutting off of current to thrustor 25. The gate 82, before transmitting an output signal on conductor 83, requires another signal on input conductor 84 that the speed of the belt conveyor has reduced to a comparatively low value, e.g. 20 percent of its normal running speed. This result is achieved by the belt speed signal on conductor 84 and the stop delay 81. The belt speed signal may be derived from a centrifugally operated switch driven by drum 5.

In order to start the conveyor, control 51 is moved to the start position to switch on the scoop thrustor 40. A start signal through conductor 64 will also be given into the gate 63. Simultaneously the logic control 85 will respond to the state of the brakes and scoop and will deliver a ready-to-run signal through conductor 86 into gate 63 if the brakes are on and the scoop is out. Having received the two input signals, output on conductor 87 of gate 63 will energise the timer 62, in particular to provide an output on conductor 66 to gate 67. A second input to gate 67 arrives from the gate 63 through start delay 88. As the scoop is moved, the stall torque of the clutch and motor torque will increase and consequently the power supplied to the motor 1 will increase. The value of this power is fed through the decade counter 58 to the divider 74 and to input 76 of the comparator 77. The memory 68 is continuously operative to feed its signal of remembered power on conductor 71 to divider 73 and thus to comparator 77. When the motor power has risen to the desired excess over the remembered power an output signal on conductor 78 from comparator 77 will reach brake control 79 and will operate to energise the brake thrustor 25 to release the brake. Since the driving torque on the conveyor drive drum 5 is then slightly greater than the torque determined by remembered power the drum will start to drive the conveyor. As the conveyor accelerates and the scoop moves to its fully-in position a signal will be received from the logic control 85 that the brakes are off and the scoop is in. Such signal is fed to gate 67 to provide a third input. With three input signals gate 67 will then give an output on conductor 69 to memory 78 to cause it to register the power signal fed from counter 58 on conductor 59.

The start delay 88 also feeds an output signal to the brake control 79 to cause brake release a predetermined time after selection of start on control 51 if for some reason the release signal has not been received on conductor 78.

For normal "stop" of the conveyor the start/stop drive control 51 is switched off, thus removing energising current to the scoop thrustor, which will then move to withdraw the scoop. A stop signal is also fed through conductor 90 to the stop delay 81 to apply the brake as previously described. Since the brake shoe supports 11 are mounted firmly without lost motion on the base 13 the application of the brake shoes onto the brake drum 15 will enable the shaft 7 to be smoothly brought to rest for the 20 percent range of belt speed over which it operates. The selection of stop on control 51 will also switch off the start signal fed through conductor 64 to gate 63. This will then remove the "off" signal fed by delay 88 to the brake on/off control and will also remove the signal fed through conductor 69 to the memory 68, whereby the memory will retain the value of the electric power being fed to the motor 1 at the instant of selection of "stop" on control 51.

The logic control 85 for its operation will receive the signals "brakes on", "brakes off", "scoop in" and "scoop out", by appropriate limit switches positioned on the brakes and on the scoop.

For emergency brake application manual selection of emergency stop on the start/stop drive control 51 produces a signal on conductor 99 which is fed directly to the brake on/off control to apply the brake. Under this operation the memory is arranged still to remain operative to remember motor torque producing power at the instant of emergency stop so that the driving torque to the conveyor may rise to the correct value before brake release when subsequently restarting the conveyor. Under loss of electric power conditions a battery supply 100 may retain the memory operative so that on restoration of power the brake may be released when the driving torque reaches the correct value. Loss of electric power would, of course, cause withdrawal of the scoop and application of the brake.

All external signals fed into the FIG. 4 control pass through interface units 91 to 98. These interface units are each formed as an optical isolator of well-known form, each of which transmits its signal by means of a light beam so that external electric disturbances may not have access into the FIG. 4 logic circuit and thus may not cause mal-function of the circuit. Similarly, the signals given out by the brake on/off control pass through an output interface unit 102 which, again, is an optical isolator.

In the described embodiment, the driving motor 1 is a squirrel cage induction motor of well-known form and, under normal circumstances, the motor is maintained connected to its electric supply and will continuously rotate at constant speed, the transmission of driving torque from the motor being determined by the scoop controlled clutch 2 which in turn will cause variation of electric power fed to the motor in accordance with driving torque. It is, however, within the scope of the invention to use any alternative form of electric motor which may have the appropriate electrical characteristics so that by electrical switching it will be able to deliver a controllable torque at its output shaft 6 without requiring that, at the same time, it should rotate. It has been found that a squirrel cage induction motor may provide such a desirable output torque without rotation if the supply to the motor is controlled by a thyristor means so arranged by virtue of a control voltage to switch power to the motor for a controllable part of each half-cycle of the alternating supply to the motor.

The memory device 68 in the illustrated embodiment is a well-known form of logic circuit. However, it is within the scope of the present invention to use any other known form of memory capable of remembering torque producing power fed to the motor and of controlling brake operation when torque producing power fed to the motor reaches a remembered power.

Again, in the illustrated embodiment, the torque producing power fed to the motor is determined from the electric voltage, current and power factor as fed to the electric motor by means of a convertor 53 working on the time division multi-plex principle. Again, within the scope of the present invention any other method of measuring motor torque may be employed. For example, motor torque may be measured by providing a transducer responding to the case reaction torque of the electric motor, the signal produced from the transducer then being fed to a memory such as memory 68 and used as described for the memory 68.

Also, whilst the motor 1 in the illustrated embodiment is an electric motor, it is within the scope of the present invention to use any other form of motor for producing driving torque. The driving torque of such other form of motor may be registered by any simple means for measuring driving torque, e.g. by measuring the case torque reaction of the motor.

It is customary with a long uphill belt conveyor to provide a number of belt driving drums at spaced positions along the belt and one or more brakes at spaced positions. In applying the invention to such a conveyor the memory device will receive the total of the instantaneous torques exerted by the motors and on start up of the conveyor the brake or brakes will be disengaged when the total motor torque at least attains the total registered in the memory device.

I claim:

1. A driving and braking apparatus including motor means for exerting driving torque on a load, a first control device for starting and terminating the driving torque, brake means for the load, a second control device for applying and disengaging the brake means for the load, a memory device adapted to receive instantaneous signals proportional to the torque fed to drive the load, and means interconnecting the first control device, the second control device and the memory device in such manner that:

(a) upon operation of the first control device to terminate the driving torque fed to the load, the second control device operates to apply the brake means and the memory device registers the magnitude of the signal of driving torque fed by the motor means to the load at the instant of such operation of the first control device, and, (b) upon subsequent operation of the first control device to start the driving torque to the load, the second control device operates to disengage the brake means when the signal of torque being fed to the load at least attains the magnitude registered in the memory.

2. A driving and braking apparatus as claimed in claim 1, including controllable slip clutch means connected between the motor means and the load, to determine the motor torque fed to the load after the operation of the first control device for starting the driving torque.

3. A driving and braking apparatus as claimed in claim 2, wherein the clutch means is a hydrodynamic clutch and including means for varying the liquid filling thereof to adjust the torque transmitted by the clutch.

4. A driving and braking apparatus as claimed in claim 3, including a control device for said means for varying the liquid filling of the clutch, operative in response to operation of the first control device for starting, to fill the clutch means slowly.

5. A driving and braking apparatus as claimed in claim 2, wherein the motor means is an electric squirrel cage induction motor and the memory device is arranged to register the product of voltage and current fed to the electric motor.

6. A driving and braking apparatus as claimed in claim 1, including a fixed time delay device and means responding to the speed of the load, both arranged to ensure that the brake means is applied following operation of the second control device either after the expiry of the time delay provided by the time delay device or when the load speed has dropped to a predetermined level.

7. A driving and braking apparatus as claimed in claim 1, wherein said interconnecting means includes a first channel from the first control device to the second control device, a comparator in the first channel ensuring signal delivery to the second control device when motor torque signal has at least attained the value registered in the memory, a second channel from the first control device to the second control device and a time delay means in the second channel ensuring a delayed signal delivery from the first control device to the second control device, each of the first and second channel signals reaching the second control device being capable of disengaging the brake means.

* * * * *